Aug. 4, 1942.    P. HOLCOMB, JR    2,291,964
TELEGRAPH SYSTEM
Filed May 13, 1939    7 Sheets-Sheet 1

INVENTOR
P. HOLCOMB, JR.
BY W.K. Sponagle
ATTORNEY

Aug. 4, 1942.   P. HOLCOMB, JR   2,291,964
TELEGRAPH SYSTEM
Filed May 13, 1939   7 Sheets-Sheet 5

INVENTOR
P. HOLCOMB, JR.
BY
ATTORNEY

Aug. 4, 1942.  P. HOLCOMB, JR  2,291,964
TELEGRAPH SYSTEM
Filed May 13, 1939  7 Sheets-Sheet 7

INVENTOR
P. HOLCOMB, JR.
BY
ATTORNEY

Patented Aug. 4, 1942

2,291,964

UNITED STATES PATENT OFFICE 2,291,964

TELEGRAPH SYSTEM

Philo Holcomb, Jr., Great Neck, N. Y., assignor to The Western Union Telegraph Company, New York, N. Y., a corporation of New York Application May 13, 1939, Serial No. 273,409

23 Claims. (Cl. 178—52)

This invention relates generally to telegraph systems and more particularly to transmitting and receiving systems wherein the timing of one or more circuits or devices is controlled by a single distributor.

The transmission of code signals in multiplex telegraphy involves the generation of signal impulses of definite length and predetermined magnitude or polarity. In the system usually employed, positive and negative potentials are impressed upon the segments of a distributor sending ring from which they are transferred to the line by means of a rotating brush. These so-called "marking" and "spacing" potentials are usually applied to the distributor by a series of transmitter or relay tongues which are positioned in various combinations on marking and spacing contacts in accordance with a pre-arranged code. Such practice requires a rotary distributor for each multiplex circuit, the speed of which must be accurately regulated and maintained constant. Likewise, in certain types of start-stop telegraph systems, sequencing distributors are employed, one being required with each circuit.

In accordance with the present invention, a novel sequencing distributor arrangement is employed which is capable of controlling a plurality of circuits or channels. A preferred embodiment comprises means whereby a series of impulses of the same polarity are applied successively to the transmitter or relay tongues and are thence directed into one or the other of two circuits by which a relay or equivalent device is operated in accordance with the tongue positions and effects the transmission of coded signals over the line. Since the impulses generated by the sequencing device are of one polarity, they may be simultaneously utilized by a number of transmitters and serve to control the timing of the signals transmitted thereby. Hence, a plurality of telegraph circuits each having substantially any desired signal frequency may be operated by one distributing device which serves to control the length of and spacing between the signals on each of said circuits. However, the invention is not limited to systems involving the timing of signals traversing a plurality of circuits by a common sequencing device but includes a novel interconnection of a commutator or equivalent distributor with a transmitter, relay bank or other multiple-circuit device having various applications which will be apparent to those skilled in the art.

Accordingly, it is an object of this invention to utilize a series of unidirectional impulses to sequence the operation of one or more multiplex channels.

Another object of the invention is to provide a means whereby a single timing device may be employed to control transmission over a plurality of telegraph circuits.

Still another object of the invention is to provide a system wherein a plurality of multiplex telegraph circuits are operated by means of a common sequencing distributor.

A further object of the invention is to provide a system for effecting the operation of a plurality of start-stop circuits by means of a common distributor.

A still further object of the invention is to provide a system using a common rotary distributor means to effect the simultaneous transmission and/or reception of a plurality of different permutation code printer signals over a plurality of independent circuits or channels.

Another object of the invention is to provide a sequencing system in accordance with any of the aforementioned objects and in which the resultant line signals are unbiased.

Another object of the invention is to provide a sequencing system according to any of the aforementioned objects and in which the line signals are not only unbiased but also have the quality of brush-transmitted signals.

Another object of the invention is to provide a master sequencing system for receiving signals from a plurality of telegraph lines having unlike physical and electrical characteristics.

Another object of the invention is to provide, in a master sequencing receiving system, means for compensating for phase displacement of signals received from lines having unlike physical and electrical characteristics.

Other objects and advantages of the invention will appear from the following description of several illustrative embodiments thereof taken in connection with the accompanying drawings, of which:

Figure 1:
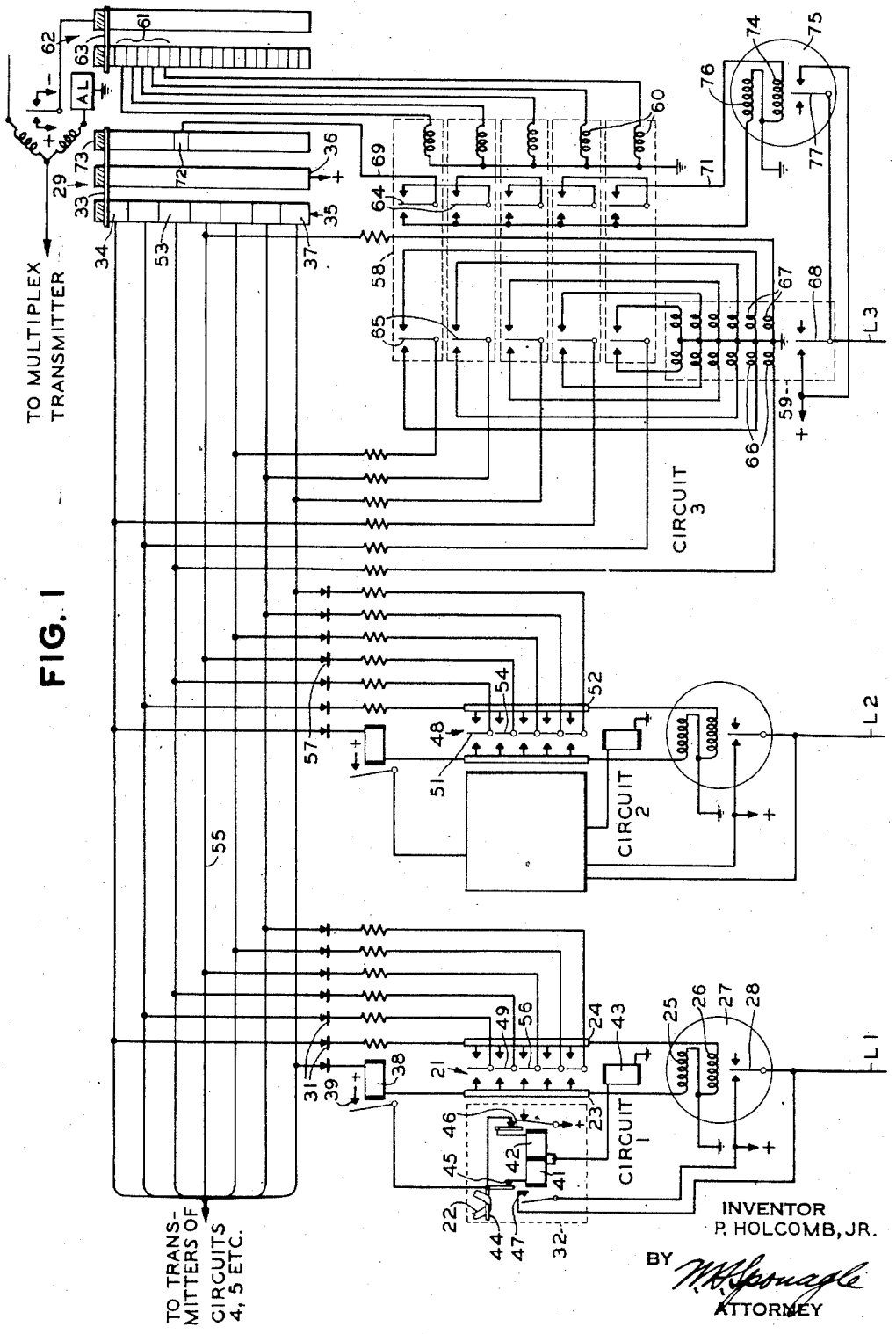
Fig. 1 illustrates a system of sequencing a plurality of start-stop transmitters and in which five-unit code signals are converted into start-stop signals and transmitted over a plurality of simplex lines.

Having reference first to Fig. 1, there is shown the transmitting apparatus for a plurality of start-stop or simplex circuits 1, 2 and 3. The transmitter 21 may be of the type shown in the patent to Benjamin No. 1,298,440 and is supplied with tape 22 prepared by a keyboard perforator or by a reperforator which may be connected to some other line circuit. It will be understood that other types of transmitters such as any storing transmitter or relay bank may be employed with equal facility. The marking and spacing bus bars 23 and 24 of the transmitter are connected respectively to windings 25 and 26 of a polarized transmitting relay 27. Battery is applied to the marking or left hand contact of this relay and the simplex line L1 to the tongue 28. An impulse generator or distributor 29 is employed to apply battery sequentially to the tongues of the transmitter 21 and, in suitable time relation, to the bus bars 23 and 24. Connected in each conductor between the distributor and the transmitter is a unidirectional conducting device such as a copper oxide rectifier 31.

Associated with the transmitter is a differentially wound auto-stop relay 32 by which the operativeness or the inoperativeness of the transmitter is controlled in accordance with the supply of perforated tape 22, in a manner with which those skilled in the art are familiar.

Assume that transmitter 21 is supplied with a copious quantity of tape and that the transmitter tongues have been set in some combination against either the marking or spacing bus bars. The engagement of the distributor brush 33 with the segment 34 of ring 35 completes a circuit from the battery connected to ring 36 including the rectifier 31 and spacing bus bar 24 to the winding 26 of relay 27. The energization of this winding moves the relay tongue 28 to its right hand contact, thus sending a spacing signal over line L1 which constitutes a "start" signal to actuate the receiving device connected to the line. As the brush 33 traverses the succeeding five segments of ring 35, impulses are applied successively to the five tongues of the transmitter by which they are directed to either of the bus bars 23 or 24 and thence to either winding 25 which moves the relay tongue 28 to its marking or left hand contact, or to winding 26 which positions the relay tongue on its spacing or right hand contact. Subsequently, the engagement of brush 33 with segment 37 sends an impulse through relay winding 38 and marking bus bar 23 to winding 25 of the transmitting relay, whereby a "rest" signal is sent to the line L1. Energization of relay winding 38 effects a momentary closure of its contact 39 whereby battery is applied to the opposed windings 41 and 42 of the autostop relay 32 and to the winding of the stepping magnet 43 of transmitter 21. The tape is thus stepped forward one character and a new character combination is set up by the tongues of this transmitter.

When the loop of tape 22 shortens sufficiently to raise the stop bar 44, autostop contact 45 is opened, and when next the brush 33 engages segment 37 and relay 38 is operated, the resultant impulse has access only to autostop winding 42 which causes this relay to operate and lock through its contact 46. An added contact 47 also closes and short circuits the tongue 28 and marking contact of relay 27. Line L1 is thus maintained in a closed condition during idle transmitter periods thereby preventing operation of the receiving device during such periods.

The transmitting system described has several advantages over prior art start-stop systems in that a constantly rotating distributor, such as herein disclosed, is free from friction clutches, stop arms, latches, etc., and their inherent weaknesses. It also is a system which may be expanded indefinitely to operate as many transmitters as desired from a single sequencing device. For example, Fig. 1 shows a second tape transmitter 48 adapted to send over line L2 by being suitably connected to the distributor 29. Corresponding terminals of transmitters 21 and 48 may be connected in parallel to the segments of ring 35 of the distributor so that transmission over lines L1 and L2 will be simultaneous. However, the transmitter 48 may be connected as shown so that its cycle of operation is started later than that of transmitter 21 by one segment of ring 35. The purpose of this arrangement is to evenly distribute the load over ring 35 in the event that one or more circuits connected thereto draws a different amount of current than the others.

Where two or more transmitters are sequenced by one distributor, there may be established slight feed-back circuits between the transmitters. Suppose that tongue 49 of transmitter 21 is set on its marking bus bar 23, tongue 51 of transmitter 48 is set on its spacing bus bar 52 and one or more of the remaining tongues of both transmitters are set on their spacing bus bars. When brush 33 engages segment 53 to send a marking signal to line L1 and a spacing signal to line L2, there is, in addition to the circuits for effecting the desired transmission, a potential circuit from spacing bus bar 52 of transmitter 48 through any tongue (other than 51) in contact with this bus bar such as tongue 54, conductor 55 and the tongue 56 of transmitter 21 in contact with spacing bus bar 24 which, if completed, would partially energize the spacing winding 26 of relay 27 and thus introduce a slight bias into the transmitted marking signal. This possible bias may be minimized by making the windings 25 and 26 of relay 27 of low resistance. But current may be prevented from flowing in this circuit by the rectifier 57 which is poled to pass current only in a direction toward the transmitter 48. By including one such rectifying device in each transmitter lead, signals sent over each line are entirely independent and unbiased irrespective of the resistance of the transmitting relay windings.

Another form of transmitting device is also shown in Fig. 1 and comprises a relay bank 58 for storing five-unit code signals and a transmitting relay 59 having a multiplicity of operating windings. The tongues of the relay bank 58 are positioned under the influence of operating windings 60 which, in this instance, are connected to the receiving segments 61 of a multiplex channel. The multiplex receiving distributor 62 and the sequencing distributor 29 are operated in a definite timed relation so that brush 33 makes one complete traverse of ring 35 for every revolution of brush 63 over the segments of the multiplex channel shown. Thus, while the word speeds of the incoming and outgoing signals are identical, it is apparent that the signal frequencies in cycles per second are different, that of the incoming signals being about triple that of the outgoing signals.

Marking signals received on the multiplex distributor 62 position the tongues 64 and 65 of relay bank 58 on their left hand contacts and spacing signals move the tongues to their right hand contacts. Connected to each of the pairs of contacts associated with the relay tongues 65 are marking windings 66 and spacing windings 67, any of which may control the operation of the tongue 68 of the transmitting relay 59. The tongues 64 and their spacing or right hand contacts are interconnected to form a baffle circuit. The terminals of this circuit are connected by conductors 69 and 71 respectively to a segment 72 of ring 73 and to winding 74 of relay 75. The marking or left hand contacts associated with tongues 64 are connected in multiple to winding 76 of relay 75. The tongue 77 of relay 75 is positioned on its marking or spacing contacts in response to the energization of either the winding 74 or 76 respectively. The baffle circuit is tested once in every revolution of the brush 33 by its engagement with segment 72 which occurs immediately after the completion of a traverse of multiplex channel 61 by brush 63 and while a "rest" signal is being transmitted over line L3. If the multiplex signals stored in the relay bank 58 are all spacing, the baffle circuit is closed and winding 74 of relay is energized effecting the engagement of tongue 77 with its marking contact. Thus line L3 is kept closed despite the disengagement of tongue 68 and marking contact of relay 59 in response to the "start" signal initiated by brush 33. However, when the multiplex signals stored in relay bank 58 include one or more marking pulses, a corresponding number of tongues 64 are moved to their left hand contacts, thereby opening the baffle circuit and providing a circuit whereby winding 76 of relay 75 is energized to disengage tongue 77 from its marking contact the next time brush 33 engages segment 72. Thus line L3 is restored to the control of transmitting relay 59.

Figure 2:
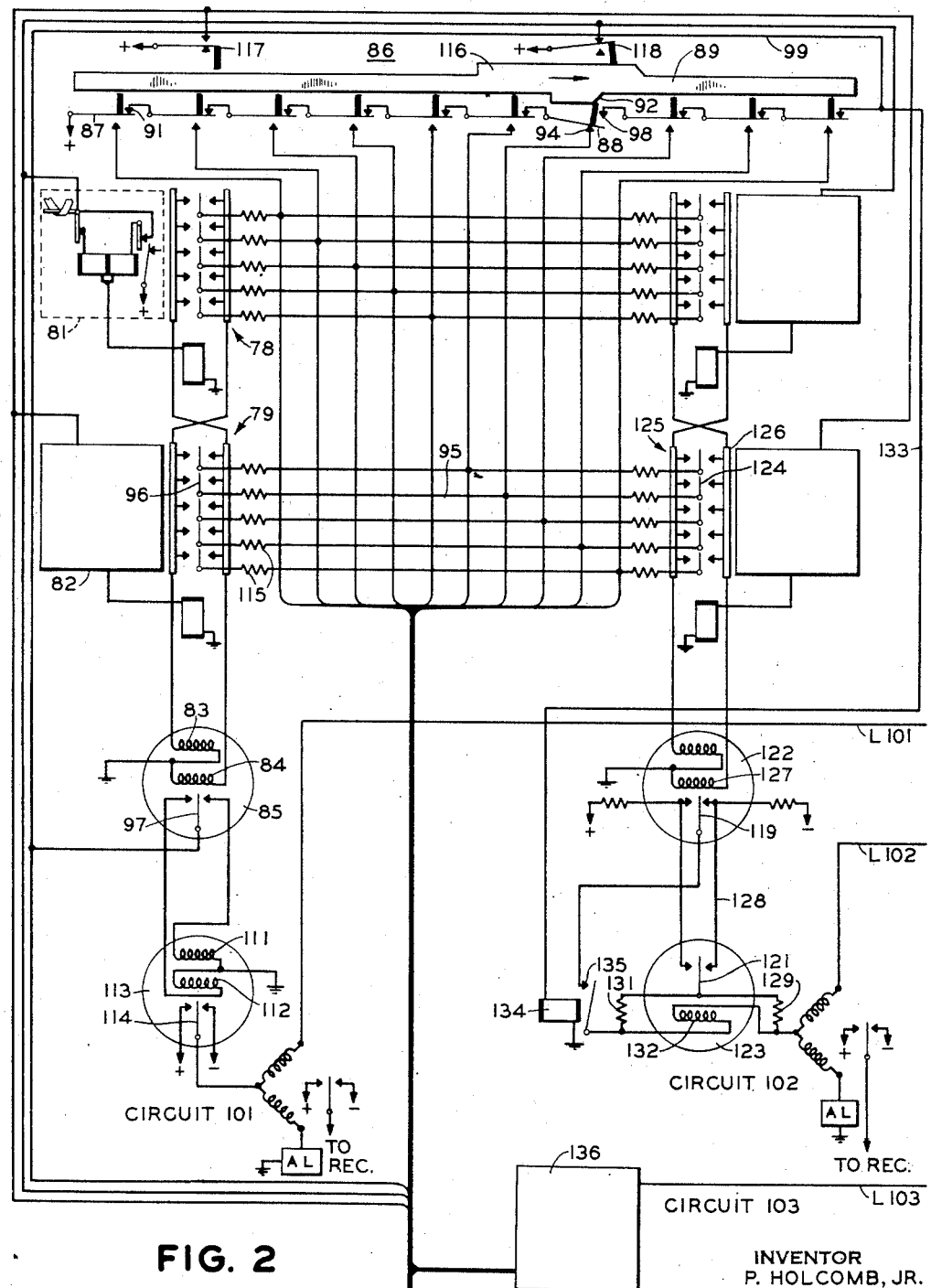
Fig. 2 represents transmitting apparatus for obtaining simultaneous transmission over a plurality of two-channel multiplex circuits.

Fig. 2 illustrates a two-channel multiplex system embodying certain features of the present invention. Circuit 101 comprises two tape transmitters 78 and 79 with their respective autostop relays 81 and 82. The transmitter bus bars are interconnected so that dissimilar bus bars are strapped together and terminate in the windings 83 and 84 of the regenerative relay 85. The purpose of this arrangement is to represent marking and spacing signals by such line signals that the polarity is reversed for each of the two channels. At times when both channels are idle and all spacing signals are being transmitted, they are represented by line potentials which are reversed between each channel so that synchronism between the sending and receiving distributors may be maintained.

The impulse generator or distributor 86 in the instant embodiment is in the form of a series of contacting members 87, 88, etc. which are actuated by means of a rotating cam or cams, a development of which is represented at 89. When engaged by a cam, the contacting members are moved into engagement with their lower contacts, but normally are held by a spring or other retractile force in engagement with their upper contacts. Battery is connected to one of the contacting members 87 and is transferred through the upper contact 91 to the succeeding member and so on through the entire series.

The operation of the system is such that when the cam 92 is engaged with contacting member 88, battery is applied through lower contact 94, conductor 95, tongue 96 and one of the bus bars of transmitter 79 to one of the windings 83 and 84 of relay 85 whereby the tongue 97 is moved to one of its contacts corresponding to the setting of the transmitter tongue 96. As the cam, in moving toward the right, becomes disengaged from the member 88 allowing it to return to its upper contact 98, a circuit is completed from battery connected to contacting member 87, through the other contacting members and their upper contacts, conductor 99, tongue 97 and one of the contacts of regenerative relay 85 to one of the windings 111 or 112 of transmitting relay 113 thereby positioning the tongue 114 of this relay in accordance with tongues 97 and 96 of relay 85 and transmitter 79 respectively. Thus a corresponding signal is sent to the line L101.

Included in the conductor 95, and in all other similar conductors, are current limiting resistors 115. In the present embodiment of the invention, feed-back circuits between the transmitters of the various multiplexes exist, but their effects are minimized by the use of the resistors 115. Thus, in extreme circumstances, sufficient feedback current may flow in one of the windings of relay 85 to produce nothing more than a slight bias to the movements of the tongue 97. But it will be noted that transmission to the line is not effected directly from relay 85. Instead, transmitting relay 113 is not actuated until stable conditions prevail in relay 85, and then by means which are not susceptible to biasing influences.

The tape stepping and other local control functions are performed by the periodic engagement of another cam 116 with the contacting members 117 and 118 in a conventional manner.

Circuit 102 of this modification of the invention, in addition to an intermediate storage or regenerative relay, is provided with continuity preserving circuits whereby line signals having the quality of brush transmitted signals are obtained with relays. By way of illustration, assume that tongues 119 and 121 respectively of the intermediate relay 122 and the transmitting relay 123 are positioned on their right hand contacts for the transmission of a negative signal to line L102, and that tongue 124 of transmitter 125 is set against the marking bus bar 126. As the cam 92 actuates the member 88 into engagement with its lower contact 94, winding 127 of relay 122 is energized and the tongue 119 is moved to its left hand contact. Negative potential is still applied to line L102 from the right hand contact of relay 122, conductor 128, right hand contact and tongue 121 of relay 123 and a pair of parallel circuits of which one comprises a shunting resistance 129 and the other comprises a series connection of another shunting resistance 131 and the winding 132 of relay 123. When cam 92 becomes disengaged from the member 88, battery, through the contacting members 87 and their upper contacts, is applied to conductor 133 to operate relay 134 which by the closure of its contact 135 applies the positive potential of the left hand contact of relay 122 to the winding 132 of transmitting relay 123. This potential is in opposition to and, being applied directly to the winding 132, is of greater effect than that applied to the winding from the right hand contact of relay 122. As a result, the tongue 121 is moved to its left hand contact.

It will be seen that the battery which is employed to operate the transmitting relay is also the battery which is applied to the line for transmitting the signals. Also, in this manner, one polarity of potential is maintained in connection with the line until the other is also connected to it at the time when the transmitting relay is being repositioned. Thus, line signals are obtained which have the same quality as those transmitted by the usual multiplex distributor. The signals are, in addition, unbiased since the intermediate relay 122 performs the same regenerative function as the relay 85 previously described.

Circuit 103 comprising transmitting apparatus 136 which may be similar to that of circuit 101 or circuit 102 or any conventional apparatus is connected to the system to transmit over line L103. Other equipment may also be connected to that shown in Fig. 2 to transmit over line L104, etc.

The various line circuits which emanate from a transmitting station, such as the one shown in Fig. 2, may be terminated at a plurality of receiving stations where the signals are received in a well known manner or they may be carried over a plurality of different routes, some more devious than others and differing in electrical characteristics, to a common receiving station located at a remote point. Hence, although transmitted simultaneously, the signals received from different circuits may be appreciably displaced in phase from one another and variously affected by interference. Accordingly, means for compensating for this phase displacement and for utilizing the portion of the respective signals least affected by interference must be included in the receiving apparatus which is to employ a single sequencing device common to all circuits.

Figure 3:
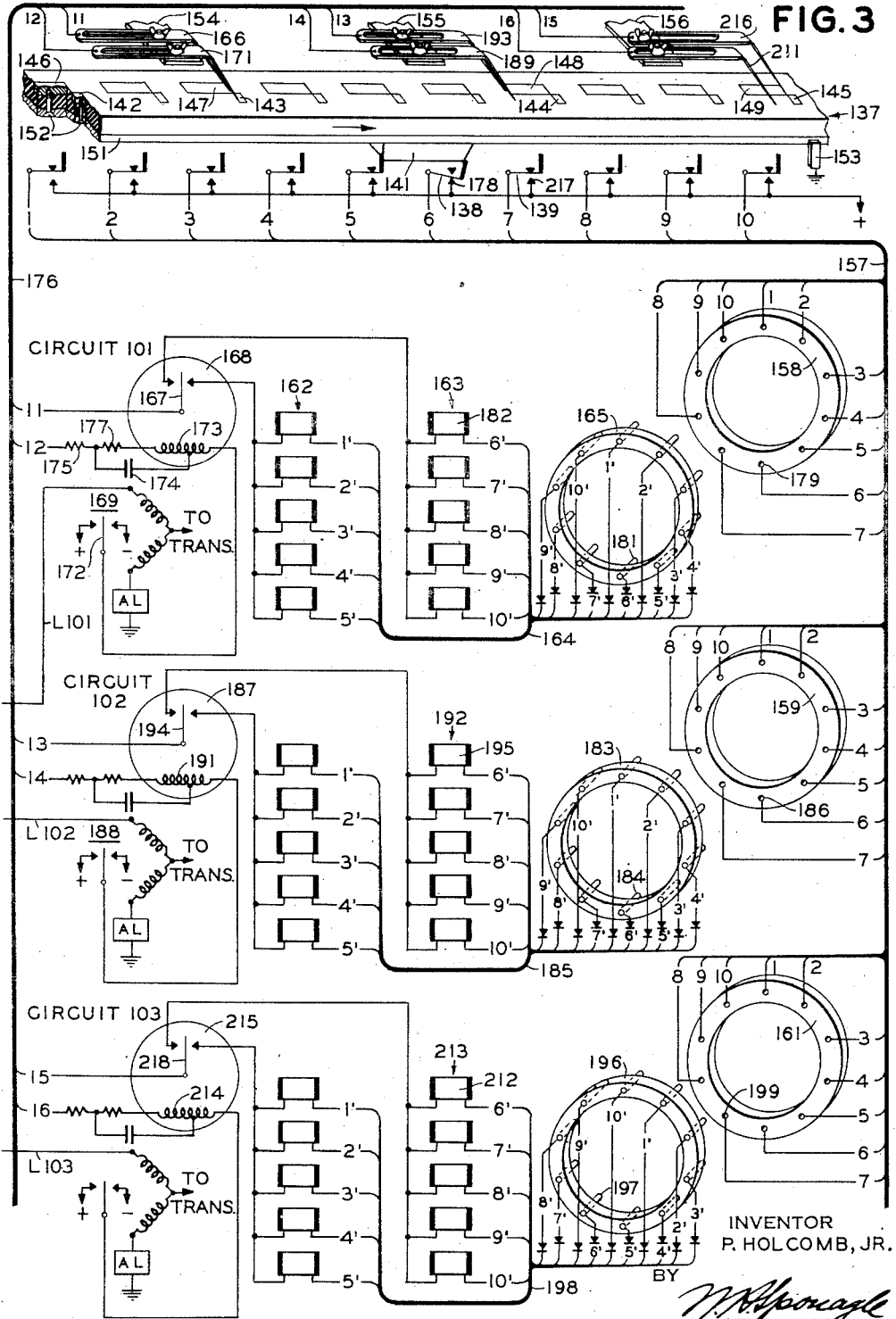
Fig. 3 shows a receiving system which may be used with the transmitting system of Fig. 2.

Fig. 3 illustrates the receiving apparatus for three circuits 101, 102 and 103 utilizing respectively lines L101, L102 and L103 terminating at such a common receiving station. As at the transmitting station, a single distributor is employed to switch the signals received from the plurality of lines to the proper receiving devices in their correct sequence. Assume, in this instance, that the receiving distributor or sequencing device is maintained in synchronism with the transmitting distributor, according to the usual multiplex practice, by the signals transmitted over line L101 which may be assumed for the present consideration to be the one producing the minimum phase distortion of the signals. It will be apparent that any of the other lines may be used for phase correction with equal facility and the amount of phase distortion present in such line is not important.

The distributor 137, a perspective development of which is shown, comprises a series of cam actuated contacting members 138, 139, etc. which are normally held against their upper contacts by any conventional retractile means. The cam 141 has a face which is equal in length to the displacement of adjacent contacting members. Forming part of the cam drum or otherwise operated in definite timed relation thereto are a series of short segments 142, 143, 144 and 145 equal in length to about one-tenth of the displacement of adjacent contacting members and a series of long segments 146, 147, 148 and 149 equal in length to about one-half of the displacement of adjacent contacting members. The segments are connected to a bottom plate 151 by a plurality of screws 152 and are maintained at ground potential by means of a brush 153 arranged to effect a sliding contact with the plate. A plurality of supporting members 154, 155 and 156, each carrying a pair of individually adjustable brushes bearing on the groups of segments, are arranged around the distributor 137. One pair of brushes is associated with each multiplex circuit.

The cam actuated contacts 138, 139, etc. are individually connected by a cable 157 to a plurality of circular terminal blocks 158, 159 and 161 in multiple. One terminal of each of the selecting magnets of the printers 162 and 163 associated with multiplex circuit 101 is connected by a cable 164 to a circular plug 165 which is adapted for insertion into the block 158 in any one of the ten positions made possible by the equal spacing of the ten like members of the plug and the ten like cooperating members of the terminal block.

The engagement of the cam 141 with successive contacting members 138, 139, etc. applies the positive potential connected to the lower contacts associated with the contacting members sequentially to one terminal of the selecting magnets of the printers 162 and 163. The application of potential to each of the magnets is for a time period equal to the time required to receive one line signal. The engagement of brush 166 with one of the long segments 146, 147, 148, 149, etc. connects a ground to the tongue 167 of polarized relay 168 which further extends it to the other terminals of the selecting magnets of printers 162 and 163 in accordance with the reception of marking signals intended for the respective printers. The tongue 167 of relay 168 is positioned on its left or right hand contacts in accordance with signals received from line L101 by polarized line relay 169 whenever brush 171 engages one of the short segments 142, 143, 144, 145, etc.

For a description of the operation of the receiving system with reference to circuit 101, assume that the first signal received over line L101 for the printer 163 is being impressed on relay 169. Also assume that this signal is marking and effects the positioning of tongue 172 of relay 169 on its left hand contact. Positive potential is thus applied to one terminal of the winding 173 of regenerating relay 168. The circuit is further extended and includes the relatively small right hand portion of winding 173, condenser 174, resistance 175, conductor 12 of cable 176, brush 171 and short grounded segment 143 which brush 171 is shown just leaving. During the brief engagement of the brush and segment, condenser 174 becomes charged, the charging current being conducted through the small portion of the winding 173 of relay 168. If, from the preceding signal, the tongue 167 of relay 168 was engaged with its right hand contact, the heavy charging current initiates a movement of the tongue toward its left hand contact. The movement is completed after the disengagement of brush 171 and segment 143 by the discharge of condenser 174 through the relatively large portion of winding 173 and resistance 177, the rapid charging of the condenser enabling positive response of the relay to an exceedingly short impulse. If the tongue 167 is in engagement with its left hand contact, the operating current mains such engagement.

The brush 171 and others corresponding thereto may be adjustably located on their respective supporting members 154, 155, 156, etc. for orienting purposes so that the engagement with the short segments may be secured during the reception of those portions of the signals least affected by interference irrespective of the phase relation thereof. To accomplish this, the brushes are provided with a range of adjustment equal to the displacement of adjacent segments. This adjustment of the brushes compensates for the average phase displacement of signals received from any of the lines with respect to those of line L101 in the assumed case. However, it is obviously within the scope of the invention to provide some conventional automatic correcting device whereby any pair of brushes may be arranged to compensate for temporary deviations of its associated signals from said average phase displacement.

As soon as brush 171 leaves short segment 143, brush 166 initiates its engagement with long segment 147 which continues for a time substantially equal to one half that required for one signal. Coincident with this engagement, cam 141 moves the contacting member 138 to its lower contact 178. For an assumed relation between the line signals and the angular position of the cam 141, the plug 165 is inserted into terminal block 158 in such a manner that block terminal 179 is engaged with plug terminal 181. Thus a circuit is completed from the battery connected to contact 178 through conductor 6 of cable 157, terminals 179 and 181, conductor 6' of cable 164, selecting magnet 182 of printer 163, left hand contact and tongue 167 of relay 168, conductor 11 of cable 176 and brush 166 to the grounded long segment 147. This circuit remains closed for approximately one half a signal length or during the time in which the first half of cam 141 is traversing the contacting member 138. However, since the impulse applied to the printer selecting magnet is generated locally and is therefore of excellent character, it is entirely adequate to produce good printer operation.

The translation of subsequent line signals into printer impulses is effected in a similar manner by the engagement of brushes 166 and 171 with succeeding segments and of the cam 141 with succeeding contacting members. The brushes such as 166 associated with the long segments are also provided with adjustments whereby their engagement with the segments may be made to occur at any desired time during the engagement of the cam 141 with any of its associated contacting members 138, 139, etc. In the operation just described, this time was selected during the first half of said engagement. Obviously, it could have been selected during the last half of said engagement or at any intermediate time and the signal would have been properly recorded on selecting magnet 182 of printer 163. Thus, it will be seen that signals lagging those just considered by as much as one half a signal may be recorded with the connection of the plug 165 and the block 158 as described, by adjusting the brushes 166 and 171 to produce the proper lag of the responsive devices.

A concrete illustration of such a condition will be considered by assuming that the signals received from line L102 arrive one half a signal length later than those received from line L101. The plug 183 is inserted into the terminal block 159 in a manner corresponding to the engagement of the plug 165 and the block 158 of circuit 101 so that plug terminal 184 associated with conductor 6' of printer cable 185 is in contact with block terminal 186. The response of regenerative relay 187 of circuit 102 to the delayed signals received by line relay 188 is made to occur one half a signal length later than the response of relay 168 of circuit 101 by moving brush 189 to a position midway between adjacent short segments. This brush is connected to the winding 191 of relay 187 by conductor 14 of cable 176 and does not engage the short segment 144 to impress the first signal destined for printer 192 upon winding 191 until the contacting member 138 is approaching engagement with the center of the face of cam 141. The brush 193 which is connected to the tongue 194 of relay 187 by conductor 13 of cable 176 is positioned so that it is engaged by the long segment 148 as soon as the engagement of brush 189 and the short segment 144 is discontinued and at the time that the contacting member 138 is at the center of the face of cam 141. Thus, it is seen that a circuit is completed through the selecting magnet 195 of printer 192 if the tongue 194 of relay 187 is on its left hand contact in response to a marking signal. Also it may be seen that the length of the impulse applied to the printer selecting magnet is equal in length to one half of a line signal.

If the signals received from any of the lines terminating at this station (Fig. 3) are further delayed so that, for example, the signal destined for the first printer selecting magnet arrives more than one half of a signal length later than the corresponding signal of circuit 101, it will be seen that even though the brush associated with the short segments may be adjusted to apply any desired portion of the signal to the regenerative relay, it is not possible to deliver the entire impulse generated by one of the long segments and its associated brush to the first selecting magnet during the engagement of cam 141 with the contacting member 138. However, it is within the scope of the instant invention to properly record all signals irrespective of the phase relation in which they are received.

For the purpose of illustrating the unlimited flexibility of the receiving system disclosed in Fig. 3 assume that the signals received from line L103 arrive three quarters of a signal length later than those received from line L101. The plug 196 is inserted in the block 161 so that plug terminal 197 associated with conductor 6' of cable 198 is in contact with block terminal 199. The brush 211 is adjusted so that it is not engaged by short segment 145 until the contacting member 138 has been traversed by approximately three quarters of the face of cam 141, at which time the delayed line signal destined for the first selecting magnet 212 of printer 213 is impressed upon the winding 214 of regenerative relay 215. The brush 216 is adjusted to be engaged by long segment 149 when the cam 141 has moved from the position shown a distance equal to the displacement of adjacent contacting members 138, 139, etc. At this time the member 139 will have just been moved to its lower contact 217 to apply positive potential to conductor 7 of cable 157. This potential is applied to one terminal of magnet 212 of printer 213 by reason of the engagement of plug terminal 197 with block terminal 199. Hence the ground connected to conductor 15 of cable 176 by the brush 216 and long segment 149 is connected to the other terminal of printer magnet 212 if the tongue 218 of relay 215 is positioned on its left hand contact in response to a marking line signal. Under these conditions printer magnet 212 is energized during the first half of the engagement of cam 141 and contacting member 139.

Thus, it is seen that, by adjustably repositioning the brushes of the distributor 137 and by suitably positioning the plugs 165, 183 and 196 in their respective terminal blocks 158, 159 and 161, signals transmitted by the apparatus of Fig. 2 or any other apparatus of this type may be received by the apparatus of Fig. 3 or its equivalent irrespective of the phase relation of said signals.

Figure 4:
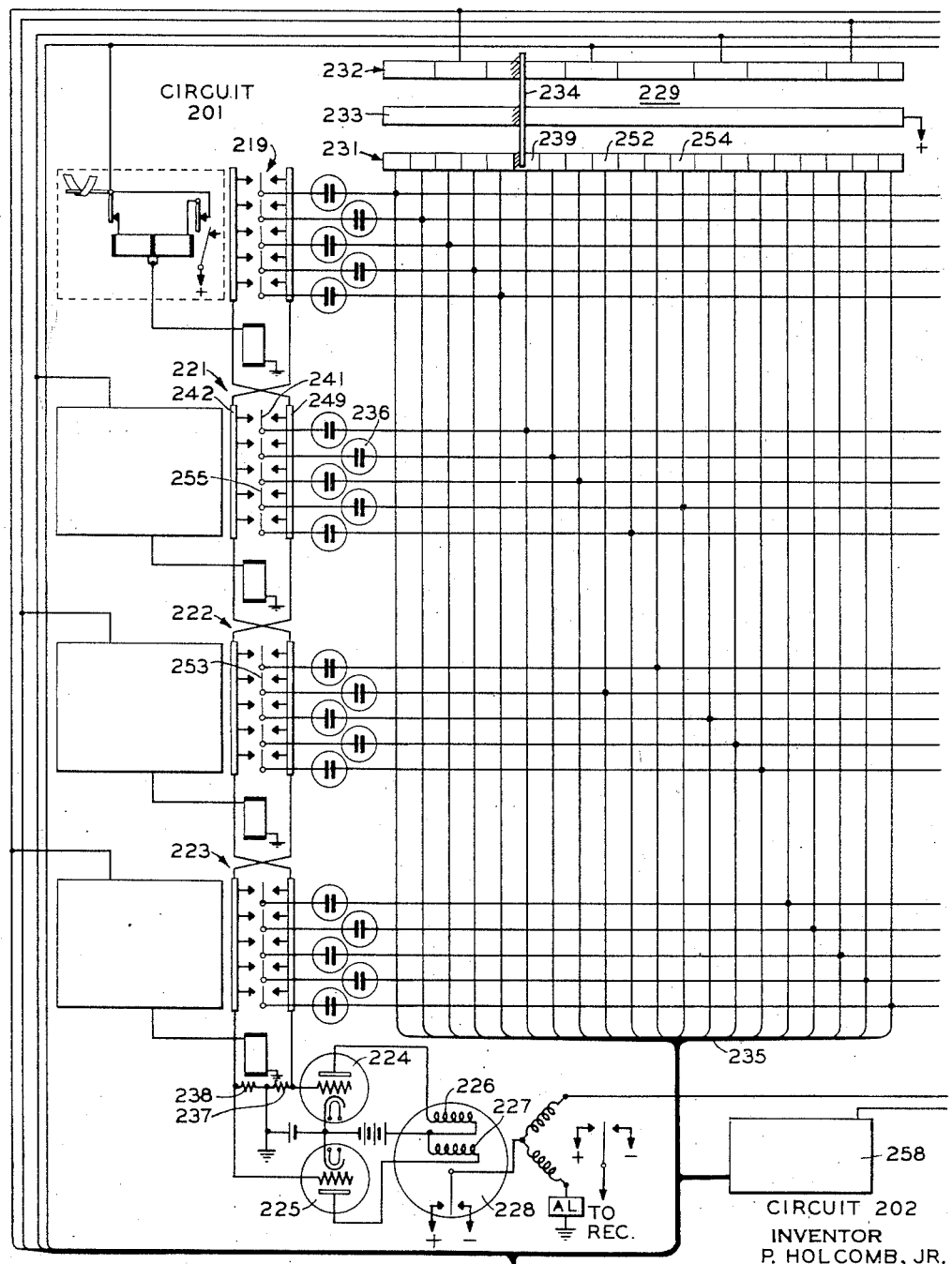
Figs. 4 and 5 depict transmitting equipment of another embodiment of the invention employing a plurality of four-channel multiplexes.
Figure 5:
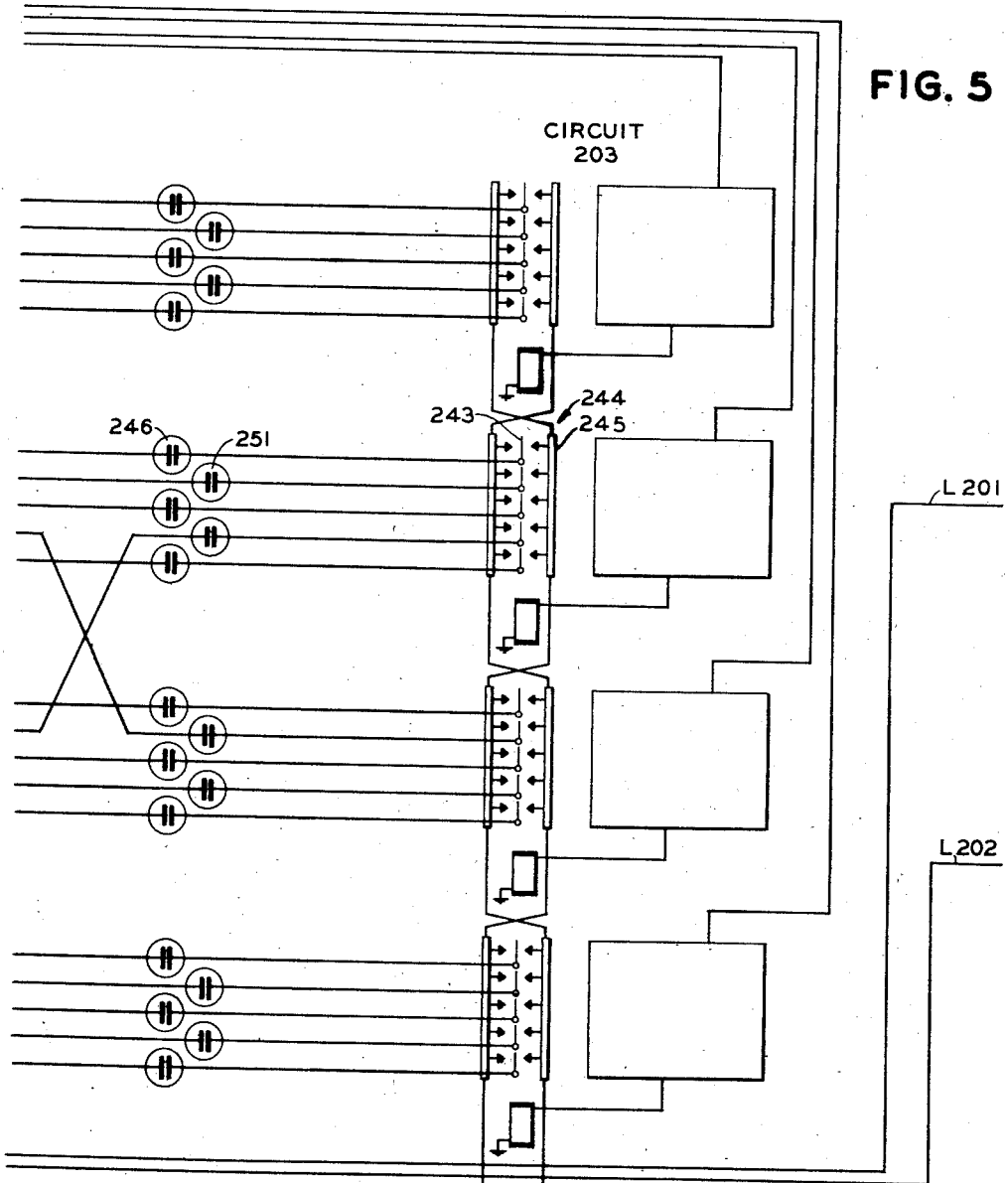

The transmitting apparatus for another form of the invention is shown in Figs. 4 and 5. The system illustrated is for the simultaneous operation of a plurality of four-channel multiplex circuits, of which two, 201 and 203, are shown. Dissimilar bus bars of adjacent transmitters 219, 221, 222 and 223 are strapped together for the purpose of producing reversals of the line potential during idle periods. Connected to the transmitter bus bars are the control circuits of a pair of thermionic vacuum tubes 224 and 225 arranged in push-pull relation to energize respectively the windings 226 and 227 of a polarized transmitting relay 228. The tubes are suitably biased so that the windings of relay 228 are either both deenergized or equally energized as desired.

The impulse generator is in the form of a segmented distributor 229 comprising two segmented rings 231 and 232 and a solid ring 233 upon which is impressed a potential. Positive potential is employed in this instance, although negative may be used if desired, provided suitable connections of the receiving apparatus and of the windings of relay 228 are made. The rings of the distributor 229 are traversed by a brush 234 by means of which battery is connected through the segments of ring 231 to successive conductors of a network 235. Also, during the brush traverse, this battery is connected periodically to the segments of ring 232 to control the tape feeding of the various channels.

The individual tongues of the transmitters are connected to separate conductors of the network through gaseous conduction or glow discharge tubes such as 236 which may comprise neon lamps, each having a breakdown potential slightly less than that applied to the transmitters by the ring 233. In operation, the present system is substantially similar to the modifications previously described. As the brush 234 passes over the segments of ring 231, either winding 226 or 227 of transmitting relay 228 is energized depending upon the position of the tongues of the transmitters 219, 221, 222 and 223. The value of the current flowing in the resistances 237 or 238 is small because of the low conductivity of the lamps such as 236 but it is sufficient to produce a potential drop across the resistances whereby either the tube 224 or 225 is conditioned to energize one of the windings of relay 228. The small amplitude of the current impulses passed by the lamps such as 236 is advantageous for the reason that the current conducted by the rings 231 and 233 is maintained at a low value, even when a large number of circuits are connected to the network 235.

Moreover, the glow discharge tubes such as 236 serve as valves to prevent the establishment of any deleterious feed-back circuits. For example, with the brush 234 in the position shown, in contact with segment 239, to transmit a marking signal to line L201 and a spacing signal to line L203, tongue 241 of transmitter 221 is set against the bus bar 242 and tongue 243 of transmitter 244 is set against bus bar 245. After conduction has been initiated in lamp 246 to operatively condition the grid 247 of tube 248, the potential of bus bar 245 is raised to a value slightly in excess of that required to render the lamp conductive. A feed-back circuit to the bus bar 249 of transmitter 221 would include discharge tubes 251 and 236 arranged in series connection. Hence, it is obvious that the potential applied to such a feed-back circuit, if selected to be only slightly in excess of the minimum value which will ionize one of the gaseous conduction tubes sufficiently to effect a discharge therethrough, will be insufficient to effect conduction through two such tubes in series. Consequently, there are no feed-back circuits in the present embodiment to produce even slightly biased signals.

Figure 6:
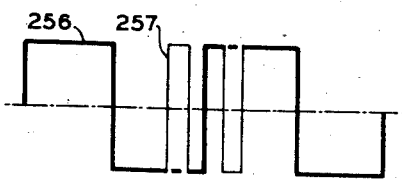
Fig. 6 is a representation of typical line signals resulting from that portion of the system shown in Fig. 4.

As the brush 234 successively engages the segments of ring 231, its contact with segment 252 effects the transmission of the signal impulse set up by tongue 253 of transmitter 222, and its contact with segment 254 effects the transmission of the signal set up by tongue 255 of transmitter 221. Thus, the transmission time relation of these two signals is reversed and since the polarities of the corresponding line signals are opposite, an interleaving effect of the second and third channels of multiplex circuit 201 is accomplished. As previously described, the usual multiplex practice of reversing the bus bar connections between adjacent transmitters produces, in one complete traverse of the distributor brush 234 during periods when all channels are idle, line signals which comprise two cycles of alternating current having a frequency equal to twenty per cent of the signal frequency. Such signals are represented in Fig. 6 by the heavy line 256, if it is assumed to be continuous as indicated by the continuous and dotted portions together.

However, with such an arrangement it is possible for a 180° out-of-phase condition between the transmitting and receiving apparatus to exist without being immediately apparent. The interleaving of the second and third channels, described hereinbefore, eliminates the possibility of such an occurrence, and at the same time, produces more reversals of the line potential during idle periods whereby closer synchronism between the transmitting and receiving distributors may be obtained. Fig. 6 also shows the line signals during idle periods resulting from the arrangements described. Such signals are represented by the solid lines, both heavy line 256 and light line 257 and may be seen to comprise four cycles of alternating current. Of course, appropriate connections of the receiving apparatus are made so that all of the signal elements of the two channels are properly received on their respective receiving devices.

Transmitting apparatus 258 of Fig. 4 is connected to the network 235 and the associated tape stepping circuits to transmit signals from circuit 202 over line L202.

Fig. 5 illustrates one manner of connecting another four-channel multiplex circuit 203, operating at the same speed as circuits 201 and 202, so that its functioning is controlled by distributor 229 of Fig. 4. It will be noted that the interleaving of the second and third channels has been omitted from circuit 203. This is made possible by the present invention because, even though two or more multiplex systems are sequenced by a common device, they are in all other respects entirely independent of one another. Their respective signals are transmitted over different line wires and may represent different characters. In fact, it is not necessary that corresponding channels of the various multiplexes be connected to their respective lines simultaneously.

Figure 7:
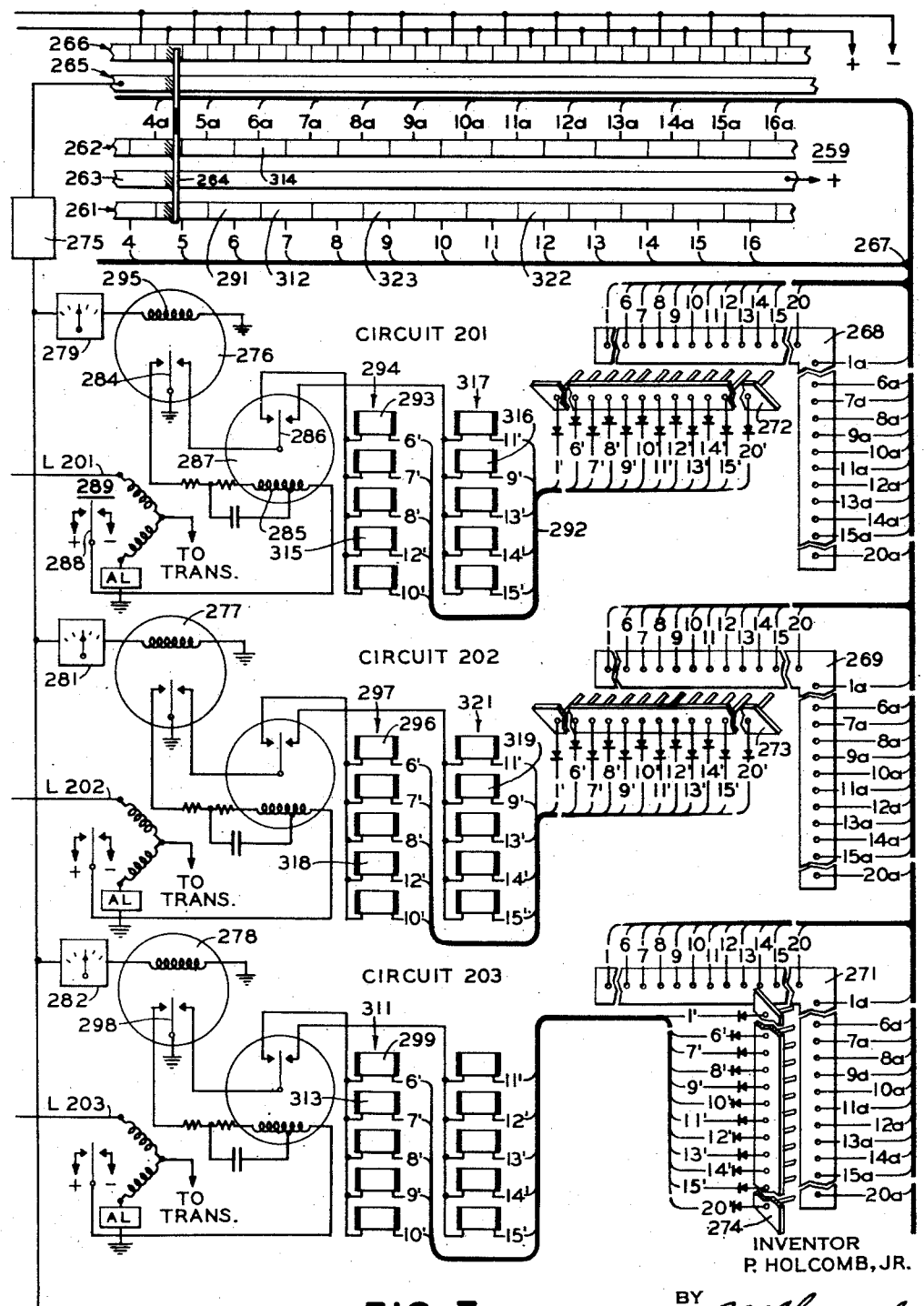
Fig. 7 illustrates a receiving system embodying the invention which may be used with the transmitting system of Figs. 4 and 5.

The essential apparatus comprising a receiving station at which a number of simultaneously sequenced multiplex circuits are terminated is illustrated fragmentarily in Fig. 7. As at the sending station, a single distributor 259 is employed to switch the signals received from the plurality of lines to the proper receiving devices in their correct sequence. The distributor 259 comprises two segmented rings 261 and 262, each having an equal number of similar segments but those of one ring being displaced one half a segment length from those of the other. A solid ring 263 furnishes battery to the segments of rings 261 and 262 through a brush 264. Local rings for providing the sixth or printing impulse to the various receiving devices also form part of the distributor but, being conventional, they have been omitted from the drawing. Two other rings 265 and 266 are either included in this distributor or are operated in a definite timed relation thereto and constitute a source of alternating current having a frequency double that of the signals. Only the apparatus for the operation of the receiving equipment of the second and third multiplex channels is illustrated, it being typical of all other channels.

The segments of rings 261 and 262 are individually connected by a cable 267 to a plurality of terminal blocks 268, 269 and 271 in multiple arrangement. It will be understood that the showing of these blocks is diagrammatic. In practicing the invention, circular terminal blocks as illustrated in Fig. 3 are preferable because of their flexibility. Segments of ring 261 are terminated horizontally and those of ring 262 vertically on these blocks. The receiving devices are connected to plugs 272, 273 and 274 which are adapted for positioning in either the horizontal or vertical portions of the terminal blocks. With circular terminal blocks, as noted above, round plugs would be employed.

Alternating current is generated on ring 265 at a frequency twice that of the line signals and is passed through a wave shaping network 275, the output of which is substantially sinusoidal. Obviously, other forms of generators of the proper frequency may be employed if desired and the wave shaping networks may be omitted in some cases, if desired. Associated respectively with the lines L201, L202 and L203 are polarized relays 276, 277 and 278 which are operated by the alternating current through individual phase shifting devices 279, 281 and 282 which are employed for varying the phase relation of the alternating current applied to the relays. The phase shifting devices are each capable of displacing the alternating current in phase by at least one complete cycle.

The operation of the receiving apparatus is substantially similar to that of Fig. 3. Assume that the signals received from line L201 are the least displaced in phase from the transmitted signals, and that those received from lines L202 and L203 are lagging the signals of line L201 by one half a signal length and three quarters of a signal length respectively, which also were the assumed conditions in the description of the embodiment of Fig. 3. Accordingly, the phase shifting devices 279, 281 and 282 are respectively adjusted to produce lagging phase displacements of zero, one half a cycle and three quarters of a cycle with respect to the generated alternating current. In response to the alternating current, the winding of the relay 276 is conditioned to oscillate the tongue 284 between its contacts, thereby alternately applying the ground connected thereto to the winding 285 and tongue 286 of the regenerator relay 287. Since a complete cycle of the alternating current generated on ring 265 occurs in the time required for the reception of one signal impulse, the winding 285 of relay 287 is rendered responsive to the signals received on the tongue 288 of the line relay 289 for one half of this time, during which the tongue 286 assumes a position corresponding to that of tongue 288. During the other half of the time, the regenerated line signal is applied to the appropriate selector magnet as previously described, a typical circuit from the battery of ring 263 being segment 291 of ring 261, conductor 6 of the multiple cable 267, conductor 6' of printer cable 292, the winding of selecting magnet 293 of printer 294, left hand contact and tongue 286 of relay 287 (if positioned to the left in response to a marking signal on the second channel) right hand contact and tongue 284 of relay 276 to ground.

If it be assumed that, during the negative half cycle of the alternating current applied to winding 295 of relay 276, the tongue 284 is engaged with its left hand contact to render the relay 287 responsive to the line relay 289 and that, during the positive half cycle, the tongue 284 is engaged with its right hand contact to deliver the regenerated signal to one of the printer selecting magnets, it will be seen that, according to the circuit just described, the magnet 293 is energized during the first half of the engagement of brush 264 with the segment 291. Hence, the signals of L202, lagging those of line L201 by one half a signal length, may be properly received by adjusting the phase shifting device 281 so that the operations of relay 277 lag those of relay 276 by one half cycle of the generated alternating current. Thus the delivery time of the regenerated signal to the selecting magnet 296 of printer 297 coincides with the engagement of brush 264 with the last half of segment 291.

Signals which are delayed with respect to those of circuit 201 by more than one half a signal length but less than one complete signal length cannot be properly applied to the printer by utilizing ring 261. The signals which are assumed to be received from line L203 are of this nature since they are delayed by three quarters of a signal length. With the phase shifting device 282 adjusted to these signals, it may be seen that during the engagement of the tongue 298 of relay 278 with its right hand contact to deliver the regenerated signal to selecting magnet 299 of printer 311, the brush 264 is traversing the last quarter of segment 291 and the first quarter of segment 312. It is obvious that one half of the regenerated signal would be applied to selecting magnet 299 and one half erroneously to magnet 313. However, this signal and all subsequent ones may be properly applied to magnet 299 by inserting the plug 274 in the vertical portion of the block 271 so that the selecting magnet is connected by conductor 6a of cable 267 to segment 314 of ring 262. The regenerated signal is thus recorded during the engagement of brush 264 with the middle half of segment 314.

By using round connecting plugs and terminal blocks as noted above, the receptive periods of the printer selecting magnets may be made to coincide with the delivery time of the regenerated signals irrespective of the phase displacement thereof.

On account of the interleaving of the second and third channels of multiplex circuits 201 and 202 described hereinbefore, the sequencing of selecting magnets 315 and 316 of the second and third channel printers 294 and 317 respectively of circuit 201 and magnets 318 and 319 of printers 297 and 321 respectively of circuit 202 are reversed in time by connecting them respectively to segments 322 and 323 of ring 261.

Figure 8:
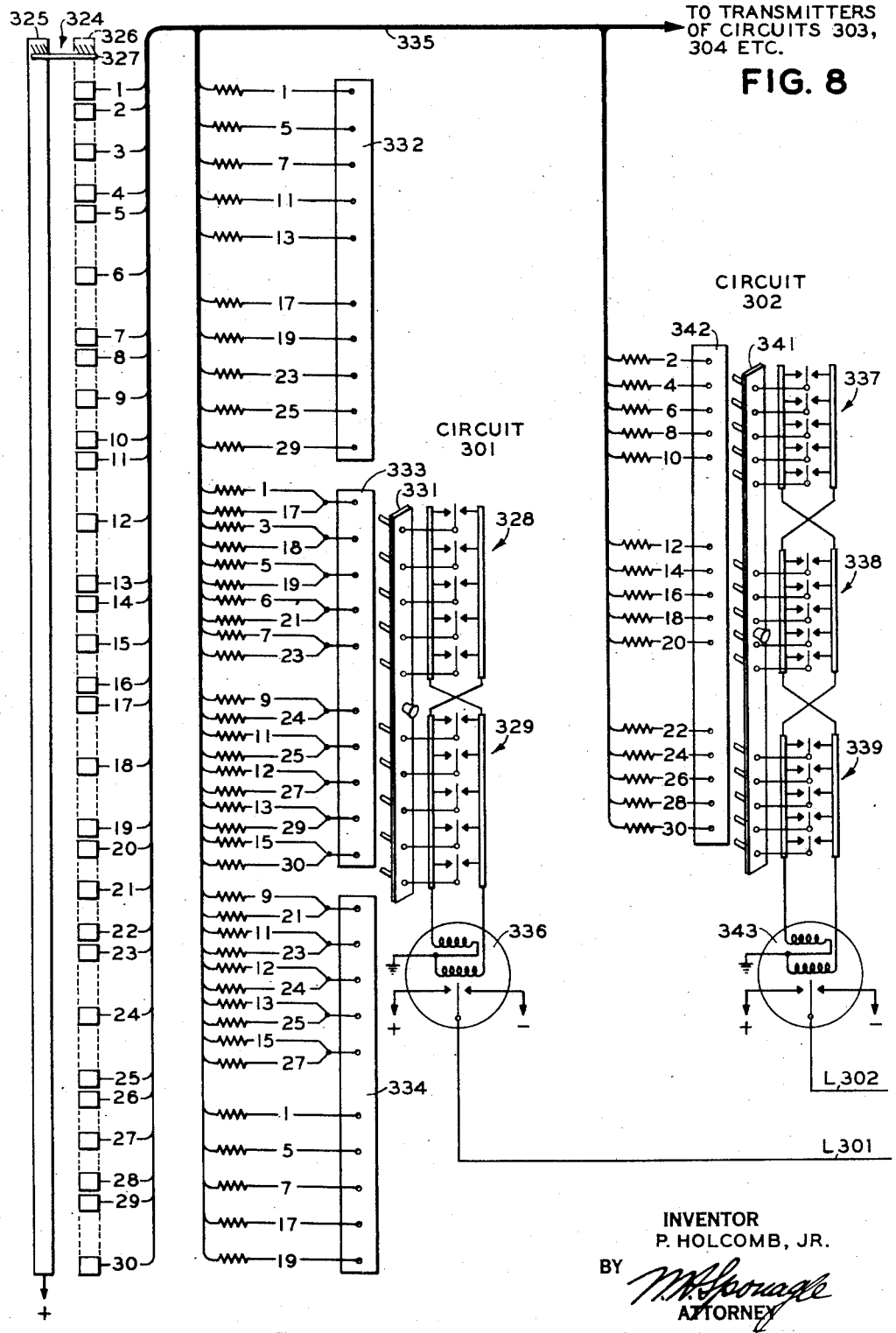
Fig. 8 illustrates an embodiment of the invention wherein a sequencing device is employed to operate a plurality of telegraph circuits at a number of different signaling frequencies.

The instant invention may also be embodied in a form whereby a plurality of telegraph circuits, each having a different speed of operation may be controlled by a sequencing device common to all circuits. Fig. 8 shows one form of the invention susceptible of this type of operation. A sequencing device 324 comprising a solid ring 325 to which is connected a source of potential, a segmented ring 326 and a brush 327 arranged traverse the rings is used for this purpose. Circuit 301 is a two-channel multiplex comprising transmitters 328 and 329 which are arranged to transmit over line L301. The tongues of the transmitters are individually terminated in a plug 331. This plug may be inserted in any one of the terminal blocks 332, 333 and 334. The terminals of these blocks are connected by conductors of a cable 335 according to a prearranged plan to the segments of ring 326.

By engaging the plug 331 with the terminal block 333, the distributor 324 is utilized to drive the transmitting relay 336 in accordance with the settings of the tongues of transmitters 328 and 329. One character from each of the transmitters is sent to line L301 by the movement of brush 327 of the distributor 324 over the segments associated with conductors 1 to 15 inclusive of cable 335. New character combinations are set up in the transmitters by means of a local ring in a well known manner. Following the transmission of the first two characters, the brush 327 continues its rotation passing successively over the segments of ring 326 associated with conductors 17 to 30 inclusive of cable 335 to send two more characters from these transmitters. Thus it is seen that in one complete traversal of the ring 326 by the brush 327, two characters are sent from each of the transmitters 328 and 329.

It should be obvious that by terminating conductors 17 to 30 inclusive of cable 335 in additional studs of a terminal block instead of connecting them in multiple with conductors 1 to 15 inclusive, a four-channel multiplex circuit may also be operated. In this case one character from each of the four transmitters comprising such a circuit would be sent for each complete traversal of the ring 326 by brush 327.

If it is desired to operate circuit 301 at a lower speed the plug 331 may be inserted in the terminal block 332. It will be noted that only half as many segments of ring 326 are connected to the terminal block 332. Hence a complete traversal of the ring 326 by brush 327 results in the transmission of one character from each of the transmitters 328 and 329. The speed of operation of circuit 301 when the transmitters are connected to terminal block 332 is one half of that when the transmitters are connected to block 333.

It may be desirable to operate one of the transmitters of circuit 301 at a relatively high speed and the other transmitter at a relatively low speed. One arrangement for accomplishing this result may be made by inserting the plug 331 in the terminal block 334. As the brush 327 crosses segments of ring 326 associated with cable conductors 1, 5 and 7, the first three character impulses are sent from transmitter 329. The subsequent engagement of brush 327 with the segments associated with cable conductors 9 to 15 inclusive effect the transmission of a complete character set up in transmitter 328. The remaining two character impulses of transmitter 329 are next sent over line L301 by the engagement of brush 327 with the segments associated with cable conductors 17 and 19. A second character is transmitted from the transmitter 328 when the brush 327 successively engages segments associated with cable conductors 21 to 27 inclusive. With this type of connection it is seen that during one complete revolution of the brush 327, one character is sent from transmitter 329 while two characters are sent from transmitter 328.

Circuit 302 which comprises transmitters 337, 338 and 339 forming a three-channel multiplex system, may also be connected to the distributor 324 for sequencing. The tongues of the transmitters are individually connected to the terminals of a plug 341 which is adapted for insertion into a terminal block 342. Certain of the segments of ring 326 are connected by conductors of cable 335 to the terminals of block 342. As the brush 327 is traversing the ring 326 to drive relay 336 of circuit 301, it also serves to operate relay 343 of circuit 302 whereby the character signals set up in the transmitters 337, 338 and 339 are sent over line L302. Thus one character is sent from each of these three transmitters for each complete revolution of the brush 327.

Such a system may be extended to operate a large number of other circuits arranged in any of the forms shown in this figure or in any of the numerous other forms which will occur to those skilled in the art.

The nature of the invention may be determined from the foregoing description of several illustrative embodiments thereof. Obviously the invention is susceptible of numerous modifications which may be comprehended within the scope of the appended claims.

What is claimed is:

1. In a telegraph system, a plurality of transmitters, each having a plurality of contact tongues movable to marking or spacing positions in code combinations independent of the code combinations of other transmitters, a distributor, a plurality of conductors each connecting one of the contacts of said distributor to a contact tongue of each of said transmitters, a source of current, a plurality of relay means each connected in series relation with said source of current and the contact tongues of one of said transmitters, and means whereby all of said relay means simultaneously respond to the setting of the contact tongues of their associated transmitters one after another in accordance with the closure of successive distributor contacts.

2. In a telegraph system, a transmitter having a plurality of contact tongues movable to marking or spacing contacts, a distributor, conductors connecting the contacts of said distributor to the respective contact tongues of the transmitter, a source of current, and a polar relay having two oppositely poled windings, one in series relation with a marking contact of said transmitter and the other in series relation with a spacing contact thereof.

3. In a telegraph system, a plurality of multi-unit code controlling means, a distributor provided with a series of contacts, one for each unit of the code, conductors connecting the respective contacts of said distributor to each of said code controlling means, code responsive means for each of said code controlling means, and means whereby said code responsive means are simultaneously controlled by their code controlling means and said distributor.

4. In a telegraph system, utilizing permutation code signals, a plurality of translating devices each having an element for each unit of the code, a common sequencing device arranged to prepare for operation the elements of said translating devices in succession, said sequencing device embodying a series of contacts multipled to the elements of all of said translating devices, and means individual to each of said translating devices to selectively complete the operation of elements of its associated translating device independently of the selective operation of other translating devices.

5. In a telegraph system, a plurality of communication channels, means for storing signal combinations for each channel, and means including a segmented distributor each of the segments of which is common to all of said channels for transmitting said signal combinations simultaneously over their respective channels.

6. A telegraph system comprising a plurality of line circuits each having one terminal thereof in a central office, the other terminals thereof being located in a distant central office, means including a sending distributor common to all of said circuits for transmitting simultaneously independent signals over said circuits, and means including a receiving distributor common to all of said circuits for independently recording simultaneously the signals sent over said circuits.

7. In a telegraph system, a plurality of line circuits, a transmitting relay associated with each of said circuits, a permutation code translating device associated with each of said circuits, an impulse generator common to all of said circuits to control the operation of said relays in accordance with their respective translating devices, and means individual to each circuit each interposed between the respective relays and their associated translating devices for converting said impulses into unbiased line signals.

8. In a telegraph system, a plurality of communication channels, a plurality of signaling devices each adapted to serve a group of said channels, a switching device associated with each of said channels, means for rendering said switching devices responsive to intelligence characters according to a prearranged code, a generator of impulses common to all of said channels, and means including said generator and said switching devices to effect the operation of said signaling devices.

9. In a telegraph system, a plurality of signaling channels, a plurality of circuit controlling devices each having a pair of operating circuits and being associated with one of said channels, a generator of impulses of like polarity, and means individually associated with each of said channels for simultaneously switching successive impulses to one or the other of said operating circuits of the associated circuit controlling device according to a prearranged code.

10. In a telegraph system, a plurality of start-stop circuits, means for storing coded intelligence signals for each of said circuits, a sequencing device common to all of said circuits, and means including said device for simultaneously transmitting said signals together with start and rest signals over said circuits.

11. A telegraph system embodying a plurality of line circuits, a source of signals for each of said circuits, sequencing means common to all of said circuits for effecting simultaneously transmission of said signals over said circuits, a receiving device associated with each of said circuits, and means including a second sequencing means common to all of said receiving devices for correctly timing the impression of said signals on the respective receiving devices irrespective of the phase relation of the signals received from the different circuits.

12. In a telegraph system embodying a plurality of line circuits and means for simultaneously signaling thereover, a receiving instrument having a plurality of code elements associated with each of said circuits, a contacting device common to all of said instruments for sequentially providing the code elements of said receiving instruments with receptive periods, a switching member associated with each of said circuits responsive to selected portions of said signals, and means including said contacting device for actuating said receiving instruments in accordance with the positions of said switching members.

13. In a telegraph system utilizing independent signals transmitted simultaneously over a plurality of diverse line circuits by reason of which the arrival at a receiving station of said signals is displaced in time, a plurality of receivers associated with said line circuits, a plurality of normally open circuits connecting with said receivers, means common to all of said receivers for periodically closing said normally open circuits in sequence, a regenerating device individual to each of said line circuits, circuits interconnecting said receivers with the respective regenerating devices, and means for operating each regenerating device in a definite phase relation with its respective signals.

14. In a receiving apparatus for a plurality of telegraph line circuits utilizing simultaneously transmitted independent signals, a plurality of receivers, means common to all of said receivers for periodically rendering said receivers receptive, a regenerating device for each of said line circuits and having an input circuit associated with its corresponding line circuit and an output circuit associated with a group of said receivers, and switching means associated with each of said line circuits and arranged to alternately energize the input and output circuits of its associated regenerating device in a predetermined time relation with the signals to be regenerated.

15. In apparatus for receiving telegraph signals from a plurality of line circuits, means including a distributor operated in phase with the signals of one of said line circuits, a plurality of receivers arranged to be conditioned for operation by said distributor, and means for regenerating signals received from said line circuits, said means including a commutator operated in definite time relation with said distributor and a pair of commutator brushes individual to each of said line circuits.

16. A telegraph system comprising a plurality of signaling circuits, a single sending distributor, means including said distributor for effecting independent and simultaneous transmission over said circuits, a single receiving distributor, and means including said receiving distributor for receiving said signals irrespective of the relative arrival times of the signals from different circuits.

17. In a telegraph system, the method of simultaneously signaling over a plurality of line circuits which comprises sequentially impressing current impulses upon a plurality of trunk circuits, simultaneously diverting each impulse therefrom into a plurality of local circuits, and utilizing each of said diverted impulses to control the operation of a transmitting device associated with one of said line circuits.

18. In a communication system a plurality of telegraph instruments each having a group of code elements, a circuit common to all of said elements of each group, a repeating apparatus connected to each of said common circuits, means for generating a series of unidirectional impulses, and means for connecting said generating means simultaneously to corresponding elements of said plurality of telegraph instruments sequentially in a predetermined order.

19. In a communication system a plurality of telegraph instruments each having a group of code elements, a group of individual circuits each being associated with corresponding elements of all of said telegraph instruments, a circuit common to all of said elements of each group, a repeating apparatus connected to each of said common circuits, a source of potential, and sequencing switch means for connecting said potential to said individual circuits one after the other.

20. In a communication system a plurality of telegraph instruments each having a group of code elements, a group of circuits each being associated with corresponding elements of all of said telegraph instruments, a line circuit for each telegraph instrument, a repeating apparatus connected directly between each line circuit and its corresponding telegraph instrument, and a sequencing device connected to time the operation of the respective circuits associated with said code elements.

21. In a telegraph system, a plurality of armatures individually movable to marking or spacing contacts, a distributor, conductors connecting the contacts of said distributor to the respective armatures, and marking and spacing signal repeating apparatus having two input circuits respectively effective to produce opposite operations of said apparatus, said input circuits being connected respectively to said marking and spacing contacts.

22. In a telegraph system, a relatively high speed signaling circuit, a plurality of armatures individually positionable on marking or spacing contacts, a distributor having a plurality of segmented rings, means including one of said distributor rings for receiving signals from said relatively high speed signaling circuit and for selectively positioning said armatures to store said received signals, a relatively low speed signaling circuit, apparatus for transmitting marking and spacing signals over said relatively low speed signaling circuit including two input circuits respectively operable to oppositely control said apparatus, said input circuits being connected respectively to a pair of said marking and spacing contacts, and means including connections between the contacts of another of said distributor rings and the respective armatures to selectively control said input circuits in accordance with the positions of said armatures.

23. In a telegraph system, a multiplex signaling circuit having a plurality of channels, a plurality of storage relays each having an operating winding and an armature controllable thereby for positioning on a marking or spacing contact, a distributor having a plurality of segmented rings, means including one of said rings for receiving signals from said multiplex circuit and for impressing said received signals successively on the operating windings of said relays, a start-stop signaling circuit, a signal transmitting device having two input circuits for transmitting signals over said start-stop circuit, said input circuits being connected respectively to a pair of said marking and spacing contacts, and means including connections between the contacts of another of said distributor rings and the respective armatures for selectively controlling the operation of said transmitting device in accordance with the positions of said armatures.

PHILO HOLCOMB, JR.